(12) United States Patent
Sejimo et al.

(10) Patent No.: US 10,442,084 B2
(45) Date of Patent: Oct. 15, 2019

(54) ROBOT, ROBOT SYSTEM AND SERVER

(71) Applicant: Seiko Epson Corporation, Tokyo (JP)

(72) Inventors: Isamu Sejimo, Matsumoto (JP);
Masaru Takahashi, Matsumoto (JP);
Izumi Iida, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/000,303

(22) Filed: Jan. 19, 2016

(65) Prior Publication Data
US 2016/0214257 A1    Jul. 28, 2016

(30) Foreign Application Priority Data

Jan. 26, 2015 (JP) .................. 2015-012141

(51) Int. Cl.
*G06F 19/00* (2018.01)
*B25J 9/16* (2006.01)
*B25J 13/08* (2006.01)

(52) U.S. Cl.
CPC ............. *B25J 9/1674* (2013.01); *B25J 9/161* (2013.01); *B25J 9/1694* (2013.01); *B25J 13/08* (2013.01); *G05B 2219/40009* (2013.01); *Y10S 901/09* (2013.01)

(58) Field of Classification Search
None
See application file for complete search history.

(56) References Cited

U.S. PATENT DOCUMENTS

| | | | | |
|---|---|---|---|---|
| 4,362,977 A * | 12/1982 | Evans | ............... | B25J 9/1692 318/568.11 |
| 4,806,066 A * | 2/1989 | Rhodes | ............... | B25J 9/046 254/286 |
| 5,572,670 A * | 11/1996 | Puckett | ............... | G06F 11/321 714/46 |
| 5,701,400 A * | 12/1997 | Amado | ............... | G06N 5/02 706/45 |
| 5,974,348 A * | 10/1999 | Rocks | ............... | G01S 1/70 348/120 |
| 6,311,093 B1 * | 10/2001 | Brown | ............... | G05B 17/02 700/95 |
| 6,438,491 B1 * | 8/2002 | Farmer | ............... | B60W 30/16 340/435 |
| 6,795,786 B2 * | 9/2004 | LaMarca | ............... | G01D 9/005 700/217 |
| 7,103,448 B2 * | 9/2006 | Kato | ............... | B25J 9/08 318/601 |
| 8,149,102 B1 * | 4/2012 | Miller | ............... | H04W 4/38 340/506 |
| 8,487,480 B1 * | 7/2013 | Kesler | ............... | B60L 11/007 307/104 |

(Continued)

FOREIGN PATENT DOCUMENTS

| | | |
|---|---|---|
| JP | 2001-242922 A | 9/2001 |
| JP | 2003-236781 A | 8/2003 |
| JP | 2004-148433 A | 5/2004 |

*Primary Examiner* — Bhavesh V Amin
(74) *Attorney, Agent, or Firm* — Harness, Dickey & Pierce, P.L.C.

(57) ABSTRACT

A robot controlled by a controller includes a recording part that records sensor information on a sensor, and a transmission part that transmits the sensor information to the controller or an external apparatus.

12 Claims, 3 Drawing Sheets

| SENSOR (TYPE) | SENSOR INFORMATION |
|---|---|
| TACTILE SENSOR | INDIVIDUAL NUMBER, ALLOWABLE RANGE, PAST DATA |
| FORCE SENSOR | INDIVIDUAL NUMBER, ALLOWABLE RANGE, RESPONSIVENESS, RESOLUTION, WEIGHT, PAST DATA |
| TORQUE SENSOR | INDIVIDUAL NUMBER, ALLOWABLE RANGE, RESPONSIVENESS, RESOLUTION, PAST DATA |
| ACCELERATION SENSOR | INDIVIDUAL NUMBER, ALLOWABLE RANGE, RESPONSIVENESS, RESOLUTION, VARIATIONS, PAST DATA |
| GYRO SENSOR | INDIVIDUAL NUMBER, ALLOWABLE RANGE, RESPONSIVENESS, RESOLUTION, VARIATIONS, PAST DATA |
| ENCODER | INDIVIDUAL NUMBER, RESOLUTION, COMMUNICATION SPEED, COMMUNICATION FORMAT, PAST DATA |
| TEMPERATURE SENSOR | INDIVIDUAL NUMBER, ALLOWABLE RANGE, RESOLUTION, PAST DATA |

(56) References Cited

U.S. PATENT DOCUMENTS

| | | | | |
|---|---|---|---|---|
| 8,849,997 B2* | 9/2014 | Okuno | H04L 43/00 | 709/217 |
| 9,077,194 B2* | 7/2015 | Covic | H02J 50/40 | |
| 9,079,305 B2* | 7/2015 | Williamson | G05B 19/406 | |
| 9,142,990 B2* | 9/2015 | Keeling | B60L 11/182 | |
| 9,352,661 B2* | 5/2016 | Keeling | B60L 11/1829 | |
| 9,513,628 B2* | 12/2016 | Crepet | G05B 23/02 | |
| 9,666,357 B2* | 5/2017 | Keeling | H02J 50/12 | |
| 9,726,518 B2* | 8/2017 | Widmer | G01D 5/2006 | |
| 9,804,623 B2* | 10/2017 | Ansari | H02J 3/46 | |
| 2002/0181405 A1* | 12/2002 | Ying | G05B 15/02 | 370/245 |
| 2004/0073411 A1* | 4/2004 | Alston | B64F 5/60 | 703/1 |
| 2004/0128029 A1* | 7/2004 | Kato | B25J 9/08 | 700/245 |
| 2004/0153868 A1* | 8/2004 | Nonaka | G05B 19/41805 | 714/47.2 |
| 2004/0236466 A1* | 11/2004 | Ota | G08B 17/10 | 700/245 |
| 2005/0251457 A1* | 11/2005 | Kashiwagi | A47L 9/009 | 705/26.1 |
| 2006/0055358 A1* | 3/2006 | Ogawa | B25J 9/1674 | 318/568.24 |
| 2006/0184467 A1* | 8/2006 | Nagashima | G06N 3/04 | 706/15 |
| 2007/0135932 A1* | 6/2007 | Pannese | B25J 9/1671 | 700/17 |
| 2007/0282495 A1* | 12/2007 | Kempton | B60L 8/00 | 701/22 |
| 2008/0244329 A1* | 10/2008 | Shinbo | G06F 11/24 | 714/45 |
| 2009/0012916 A1* | 1/2009 | Barnett | G06Q 50/06 | 705/412 |
| 2009/0103341 A1* | 4/2009 | Lee | B60W 10/26 | 363/124 |
| 2009/0229900 A1* | 9/2009 | Hafner | B60L 3/0046 | 180/65.275 |
| 2009/0259340 A1* | 10/2009 | Umemoto | A61B 1/0051 | 700/275 |
| 2009/0295577 A1* | 12/2009 | Yamaguchi | G01S 17/026 | 340/541 |
| 2010/0256864 A1* | 10/2010 | Ying | H04L 43/50 | 701/31.4 |
| 2010/0277121 A1* | 11/2010 | Hall | B60L 11/182 | 320/108 |
| 2012/0173185 A1* | 7/2012 | Taylor | G01B 11/026 | 702/104 |
| 2012/0215913 A1* | 8/2012 | Okuno | G05B 23/0221 | 709/224 |
| 2012/0233062 A1* | 9/2012 | Cornish | B25J 11/00 | 705/39 |
| 2012/0313742 A1* | 12/2012 | Kurs | B60L 11/182 | 336/180 |
| 2013/0154553 A1* | 6/2013 | Steele | B60L 11/182 | 320/108 |
| 2013/0207482 A1* | 8/2013 | Madawala | H02J 7/025 | 307/104 |
| 2013/0334892 A1* | 12/2013 | Hall | H01F 38/14 | 307/104 |
| 2014/0015329 A1* | 1/2014 | Widmer | G01D 5/2006 | 307/104 |
| 2014/0067124 A1* | 3/2014 | Williamson | G05B 19/406 | 700/258 |
| 2014/0074433 A1* | 3/2014 | Crepet | G05B 23/02 | 702/183 |
| 2014/0125140 A1* | 5/2014 | Widmer | H02J 7/025 | 307/104 |
| 2014/0327391 A1* | 11/2014 | Niederhauser | B60L 11/182 | 320/108 |
| 2015/0170833 A1* | 6/2015 | Widmer | H01F 38/14 | 307/104 |
| 2015/0270719 A1* | 9/2015 | Kurs | H02J 5/005 | 320/108 |
| 2016/0016479 A1* | 1/2016 | Khaligh | B60L 11/1812 | 363/17 |
| 2016/0025821 A1* | 1/2016 | Widmer | G01R 33/0047 | 324/258 |
| 2016/0068069 A1* | 3/2016 | Percebon | B60L 11/182 | 307/104 |
| 2016/0214257 A1* | 7/2016 | Sejimo | B25J 13/08 | |
| 2017/0166070 A1* | 6/2017 | Dunger | B60L 11/1824 | |
| 2017/0203655 A1* | 7/2017 | Miller | B60L 11/182 | |

\* cited by examiner

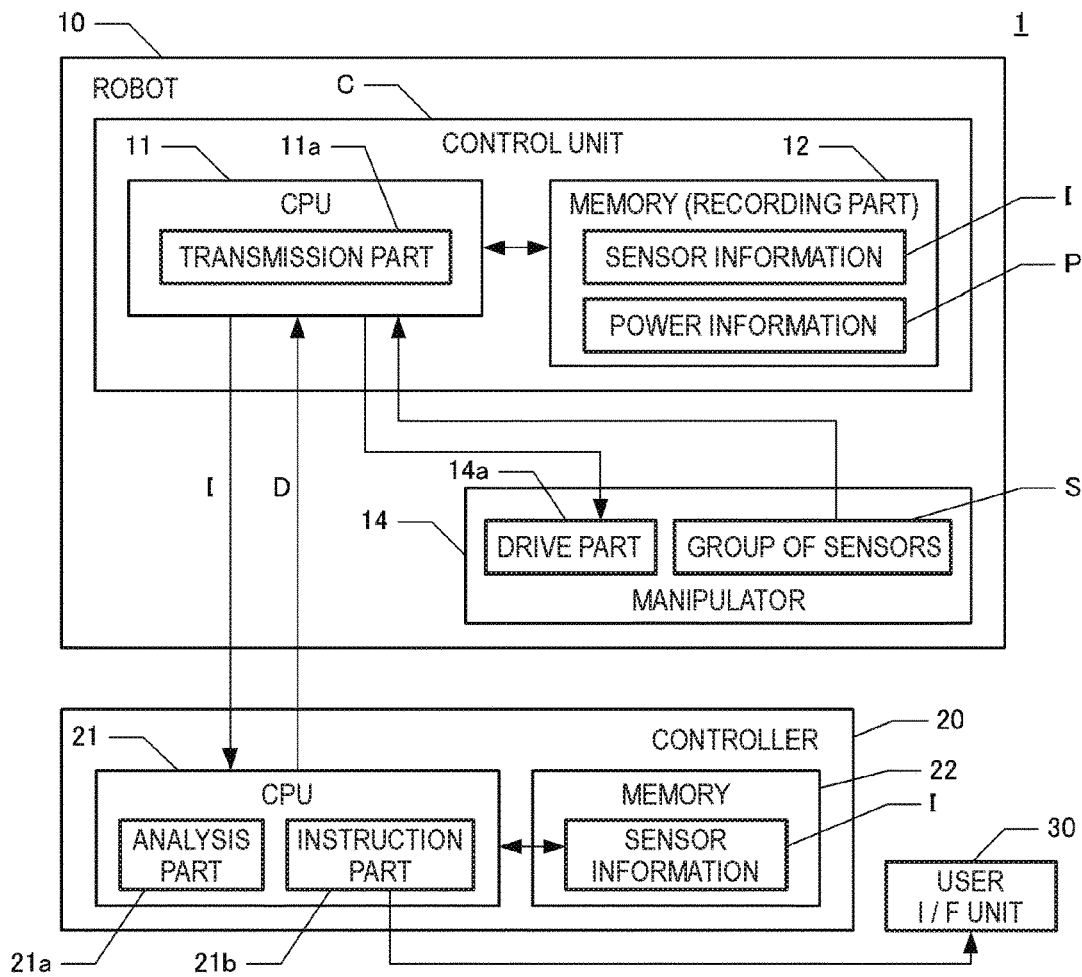

FIG. 1A

| SENSOR (TYPE) | SENSOR INFORMATION |
|---|---|
| TACTILE SENSOR | INDIVIDUAL NUMBER, ALLOWABLE RANGE, PAST DATA |
| FORCE SENSOR | INDIVIDUAL NUMBER, ALLOWABLE RANGE, RESPONSIVENESS, RESOLUTION, WEIGHT, PAST DATA |
| TORQUE SENSOR | INDIVIDUAL NUMBER, ALLOWABLE RANGE, RESPONSIVENESS, RESOLUTION, PAST DATA |
| ACCELERATION SENSOR | INDIVIDUAL NUMBER, ALLOWABLE RANGE, RESPONSIVENESS, RESOLUTION, VARIATIONS, PAST DATA |
| GYRO SENSOR | INDIVIDUAL NUMBER, ALLOWABLE RANGE, RESPONSIVENESS, RESOLUTION, VARIATIONS, PAST DATA |
| ENCODER | INDIVIDUAL NUMBER, RESOLUTION, COMMUNICATION SPEED, COMMUNICATION FORMAT, PAST DATA |
| TEMPERATURE SENSOR | INDIVIDUAL NUMBER, ALLOWABLE RANGE, RESOLUTION, PAST DATA |

FIG. 1B

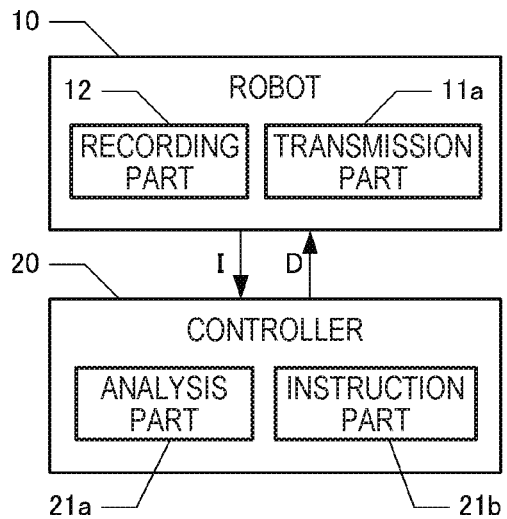
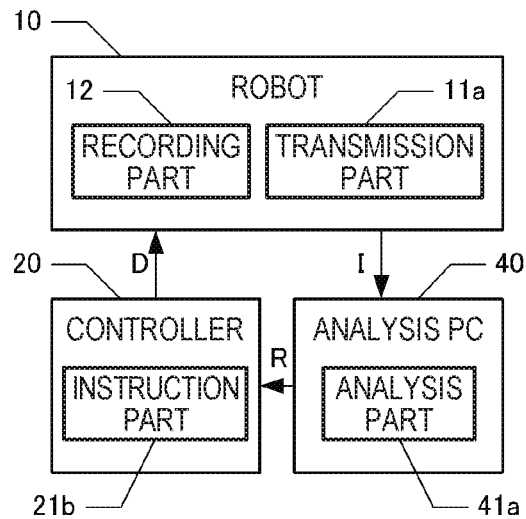
FIG. 3A  FIG. 3B
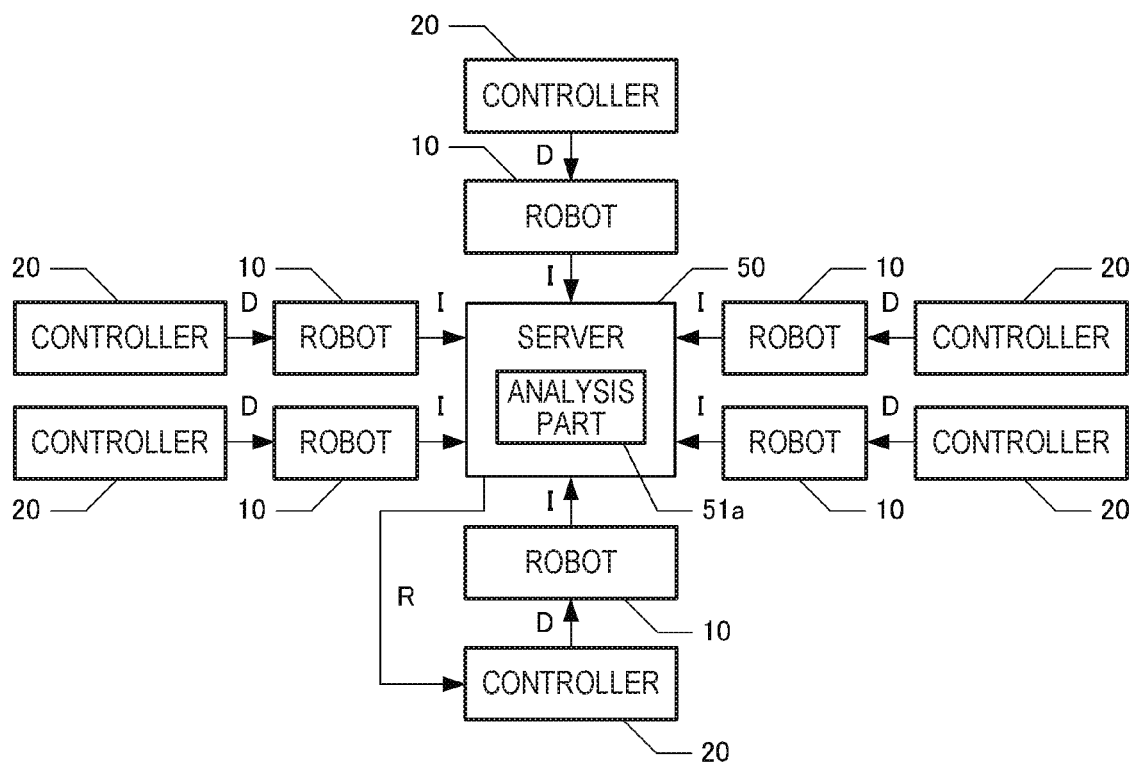
FIG. 3C

ROBOT, ROBOT SYSTEM AND SERVER

BACKGROUND

1. Technical Field

The present invention relates to a robot, a robot system and a server.

2. Related Art

In robots controlled by robot control apparatuses, a technology of storing parameters used for calculation of trajectory control of a movable unit of a robot within the robot is known (see Patent Document 1 (JP-A-2004-148433)). Further, a technology of storing unique data representing an operation history and a maintenance history of a robot controlled by a controller in both the robot and the controller is known (see Patent Document 2 (JP-A-2001-242922)). According to these technologies, even when the robot control apparatus or the controller for controlling the robot is replaced, the robot may be controlled based on the data recorded at the robot side.

However, it may be impossible to appropriately control the robot using only the parameters used for the calculation of trajectory control or the operation history and the maintenance history of the robot.

SUMMARY

An advantage of some aspects of the invention is to provide a technology that enables appropriate control of a robot even when the robot controlled by a controller is replaced.

A robot according to an aspect of the invention is a robot controlled by a controller including a recording part that records sensor information on a sensor, and a transmission part that transmits the sensor information to the controller or an external apparatus.

In the configuration, the sensor information on the sensor provided in the robot is recorded at the robot side, and thereby, the controller may receive the sensor information from the robot side and appropriately control the robot based on the sensor information. Even when the robot controlled by the controller is replaced, the robot may be appropriately controlled based on sensor information recorded in the robot after replacement. Particularly, the controller can appropriately control the robot using a measurement result of the sensor based on the sensor information of the robot after replacement. Note that the sensor information is not necessarily transmitted directly to the controller. For example, the sensor information may be transmitted to an external apparatus or a server, not the controller. In this case, the external apparatus or the server may generate information for controlling the robot based on the sensor information and transmit the information to the controller.

BRIEF DESCRIPTION OF THE DRAWINGS

The invention will be described with reference to the accompanying drawings, wherein like numbers reference like elements.

FIG. 1A is a block diagram of a robot system, and FIG. 1B is a table of sensor information.

FIG. 3A is a block diagram of a robot system of the first embodiment, and FIGS. 3B and 3C are block diagrams of robot systems of other embodiments.

DESCRIPTION OF EXEMPLARY EMBODIMENTS

Figures 2A, 2B, 2C:
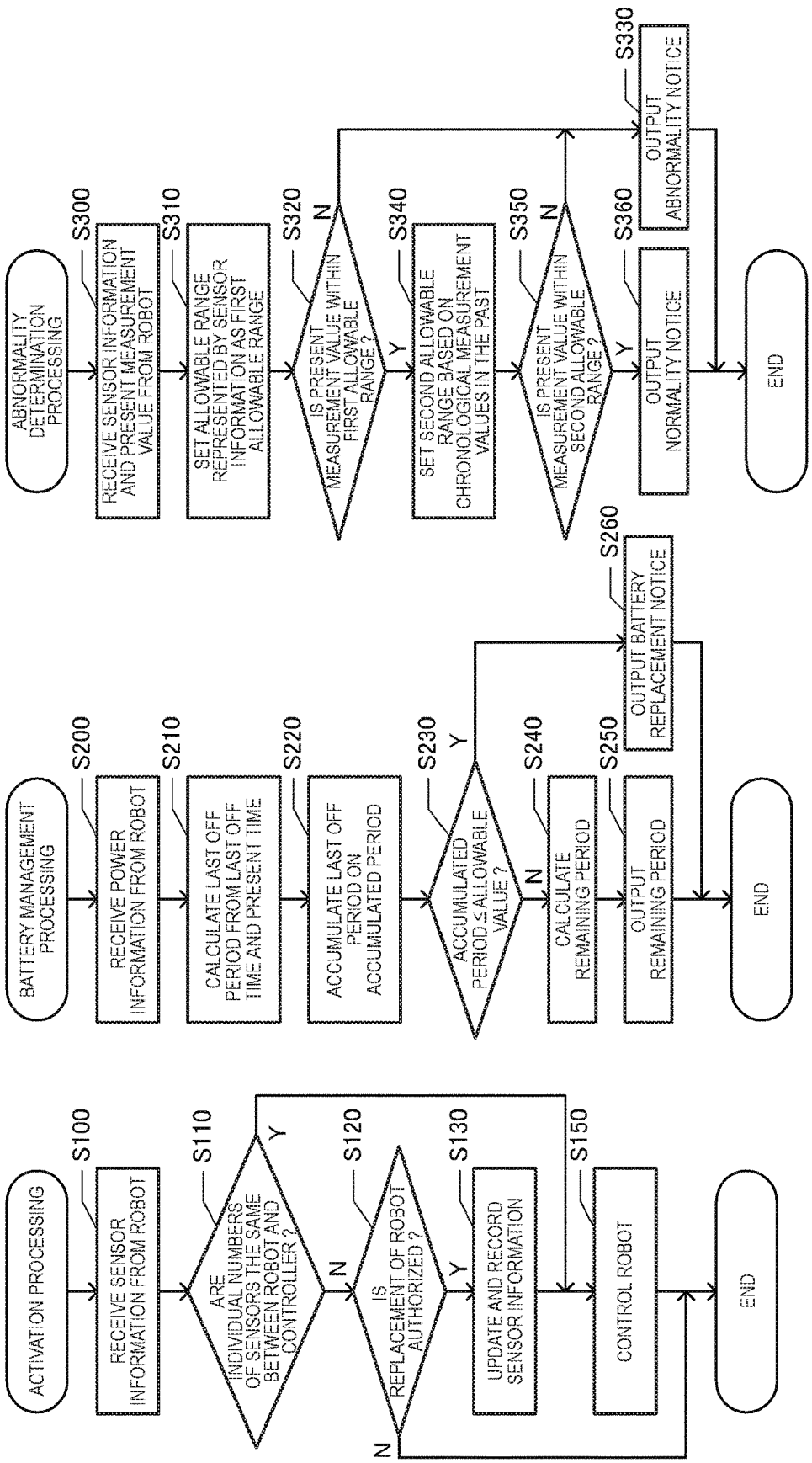
FIG. 2A is a flowchart of activation processing.
FIG. 2B is a flowchart of battery management processing.
FIG. 2C is a flowchart of abnormality determination processing.

Hereinafter, embodiments of the invention will be explained with reference to the accompanying drawings. In the respective drawings, the same signs are assigned to corresponding component elements and the overlapping explanation will be omitted.

(1) Configuration of Robot System:
(2) Processing of Robot System:
(3) Other Embodiments:

1. Configuration of Robot System

FIG. 1A is a block diagram of a robot system 1 according to one embodiment of the invention. The robot system includes a robot 10, a controller 20, and a user I/F (interface) device 30. The controller 20 is communicably connected to the robot 10. The connection is compliant with e.g. wired communication standards including Ethernet (registered trademark) and USB (Universal Serial Bus) and wireless communication standards including Wi-Fi (registered trademark). The controller 20 is a computer for controlling the robot 10 and the user I/F device 30.

The robot 10 is controlled by the controller 20. The robot 10 includes a control unit C and a manipulator 14. The robot 10 of the embodiment is a seven-axis single-arm robot and includes the single manipulator 14. The manipulator 14 includes a drive part 14a and a group of sensors S. The drive part 14a includes motors for rotationally driving the seven-axis drive shafts. The group of sensors S will be described later.

The control unit C is a computer including a CPU 11, a memory 12, etc. The control unit C controls the manipulator 14 based on a control signal D transmitted from the controller 20. Specifically, the control unit C generates a signal for driving the drive part 14a provided in the manipulator 14, outputs the signal to the drive part 14a, and thereby, controls the manipulator 14. The CPU 11 executes a program based on data recorded in the memory 12, and thereby, realizes a transmission part 11a. That is, the transmission part 11a is realized by cooperation of a hardware resource (e.g. a memory controller) and a program in the CPU 11. The transmission part 11a is a functional configuration for transmission of sensor information I to the controller 20, and the details will be described later.

The memory 12 records the sensor information I and power information P. The sensor information I is information on the group of sensors S provided in the manipulator 14. The memory 12 is a non-volatile recording medium that can retain data even in a period when the power of the robot 10 is OFF and corresponds to a recording part that records the sensor information I on the sensors.

FIG. 1B is a table showing an example of sensors forming the group of sensors S and contents of the sensor information I on the sensors. As shown in the left column of FIG. 1B, the sensor information I represents types of sensors with respect to each sensor. The robot 10 of the embodiment includes a tactile sensor, a force sensor, a torque sensor, an acceleration sensor, a gyro sensor, an encoder, and a temperature sensor. The sensor information I contains individual numbers unique to the respective individual sensors as individual information. Further, the sensor information I contains information representing performance of the respective sensors (allowable range, responsiveness, resolution, variations, weight, communication speed, communication format). Furthermore, the sensor information I contains past data representing measurement values in chronological order (at predetermined time intervals in normal operation) of the respective sensors in the past.

The tactile sensor is provided in a gripper for gripping work or the like in the manipulator 14. The tactile sensor elastically deforms in response to contact between the gripper and the work or the like, detects an amount of displacement in the elastic deformation, and thereby, senses the contact with the work or the like and measures a gripping force of the work or the like. The force sensor and the torque sensor are provided in a predetermined measurement part (e.g. an end effector) of the manipulator 14. The force sensor measures a direction and a magnitude of a three-dimensional force acting on the measurement part. The torque sensor measures a direction and a magnitude of three-dimensional torque acting on the measurement part.

The acceleration sensor and the gyro sensor are provided in a predetermined measurement part (e.g. an end effector, respective joints, or the like) of the manipulator 14. The acceleration sensor measures a direction and a magnitude of three-dimensional acceleration in the measurement part. The gyro sensor measures a direction and a magnitude of a three-dimensional angular velocity in the measurement part. The encoder is provided in a movable part of the manipulator 14 and measures an amount of movement of the movable part (a rotation angle of each joint) of the manipulator 14. The temperature sensor measures the temperature of the manipulator 14.

The allowable range represented by the sensor information I is a range of the measurement value measured by each sensor and a range of the measurement value in which the operation of each sensor is allowed. The range of the measurement value in which the operation of each sensor is allowed may be a range in which each sensor can normally measure the measurement value, a range in which the accuracy of the measurement value of each sensor is equal to or more than a predetermined reference, or a range in which each sensor is not broken. The responsiveness represented by the sensor information I refers to rapidity of reflection of a change in state of the measuring object on the measurement value of each sensor. The resolution represented by the sensor information I refers to the minimum unit of the measurement value that can be measured by each sensor. A correction value for correcting the measurement value to a true value may be derived based on the variations represented by the sensor information I.

The weight of the force sensor represented by the sensor information I refers to a weight of the force sensor. The communication speed of the encoder represented by the sensor information I refers to a communication speed (clock frequency) when the encoder transmits the data of the measurement value to the control unit C. The communication format represented by the sensor information I refers to a format of the data of the measurement value. As described above, the sensor information I represents the type of the sensor, the performance of the sensor, and the chronological measurement values of the sensor in the past.

The power information P is information representing an accumulated period of periods in which the power of the robot 10 is OFF in the past and the last OFF time when the power of the robot 10 is last turned OFF. Turning OFF of the power of the robot 10 is shutdown of the commercial power supply supplied to the robot 10. The robot 10 includes e.g. a battery (primary battery) in the encoder or the like and, even in a period in which the power of the robot 10 is OFF, the minimum power for the encoder or the like may be obtained. Note that the necessary power for the encoder or the like may be obtained from the commercial power supply in the period in which the power of the robot 10 is ON, the battery of the robot 10 is not consumed. As described above, the memory 12 as the recording part records the power information P for identification of the periods in which the power of the robot 10 is OFF with the sensor information I.

Next, the controller 20 is explained. The controller 20 includes a CPU 21 and a memory 22. The CPU 21 executes a program based on data recorded in the memory 22, and thereby, realizes an analysis part 21*a* and an instruction part 21*b*. That is, the analysis part 21*a* and the instruction part 21*b* are realized by cooperation of a hardware resource and programs in the CPU 21. The analysis part 21*a* is a functional configuration for receiving the sensor information from the robot 10 and analyzing the sensor information I, and the details will be described later. The instruction part 21*b* is a functional configuration for generating a control signal D based on the sensor information I and outputting the control signal D to the robot 10, and the details will be described later. The controller 20 is connected to the user I/F device 30. The user I/F device 30 includes a display part and an input part and receives input operations relating to various images displayed in the display part by the input part.

2. Processing of Robot System 2-1 Activation Processing:

As below, the functional configurations (transmission part 11*a*, analysis part 21*a*, instruction part 21*b*) of the robot system 1 will be explained with processing of the robot system. FIG. 2A is a flowchart of activation processing executed by the controller 20. For example, the activation processing is executed when at least one of the power of the robot 10 and the power of the controller 20 is turned ON. First, the controller 20 receives the sensor information I from the robot 10 (step S100). That is, in the robot 10, the transmission part 11*a* transmits the sensor information I recorded in the memory 12 to the controller 20. The transmission part 11*a* also transmits the power information P with the sensor information I to the controller 20.

Then, the analysis part 21*a* determines whether or not the individual numbers of the sensors are the same between the robot 10 and the controller 20 (step S110). That is, the analysis part 21*a* determines whether or not the individual number represented by the sensor information I acquired from the robot 10 at step S100 coincides with the individual number represented by the sensor information I recorded in the memory 22 of itself. Thereby, whether or not all of the individuals of the sensors provided in the robot 10 controllably connected to the controller 20 in the present in which the power is ON are the same as all of the individuals of the sensors provided in the robot 10 controllably connected to the controller 20 when the power was last turned OFF may be determined. Namely, whether or not the robot 10 controllably connected to the controller 20 was replaced from the time when the power is last turned OFF to the present time when the power is turned ON. As described above, the controller 20 receives the sensor information I from the robot 10 and determines whether or not the individual of the controllably connected robot 10 has been changed based on whether or not the individual numbers as individual information of the sensors represented by the sensor information I change.

If the individual numbers of the sensors are the same between the robot 10 and the controller 20 (step S110: Y), the instruction part 21*b* performs control of the robot 10

(step S150). Specifically, the analysis part 21a analyzes the sensor information I stored in the memory 22, and the instruction part 21b generates the control signal D for operation of the manipulator 14 based on the analysis result and outputs the control signal D to the control unit C of the robot 10. In the embodiment, the instruction part 21b controls the manipulator 14 in a combination of location control and force control.

First, the location control is explained. The instruction part 21b location-controls a drive part 14a of the manipulator 14 so that a control reference point of the manipulator 14 (e.g. a predetermined location of the end effector) may be in a target location and position (orientation). Specifically, the instruction part 21b acquires a target measurement value of the encoder (a rotation angle of each joint) corresponding to the target location and position of the control reference point with reference to a location conversion table with respect to each individual of the robot 10, and PID (Proportional-Integral-Derivative)-controls the drive part 14a to obtain the target measurement value. The location conversion table may be recorded with e.g. the sensor information I in the memory 12 of the robot 10. Further, the instruction part 21b performs PID control based on measurement values of the acceleration sensor and the gyro sensor so that the manipulator 14 may realize target acceleration and angular velocity. Note that the control of the manipulator 14 is not necessarily the PID control, but may be any control as long as the control reduces the differences between the target acceleration and angular velocity and the measurement values.

In setting of the target acceleration and angular velocity, the instruction part 21b sets target deceleration (an absolute value of negative acceleration) of the manipulator 14 immediately before stop to be smaller as the weight of the force sensor represented by the sensor information I is larger. Thereby, the influence by remaining vibration to be more significant as the weight of the force sensor is larger may be suppressed. Further, in location control, in setting of the target acceleration and angular velocity, the instruction part 21b sets acceleration and an angular velocity within the allowable ranges of the acceleration sensor and the gyro sensor represented by the sensor information I. Furthermore, the instruction part 21b acquires correction values formed by correction of the measurement values of the acceleration sensor and the gyro sensor based on variations of the acceleration sensor and the gyro sensor represented by the sensor information I. Then, the instruction part 21b performs PID control in response to the correction values of the measurement values of the acceleration sensor and the gyro sensor.

In addition, the instruction part 21b acquires responsiveness of the encoder based on the communication speed and the format of the encoder represented by the sensor information I. Then, the instruction part 21b sets gain in the PID control in response to the measurement value of the encoder (the rotation angle of each joint) and the measurement values (correction values) of the acceleration sensor and the gyro sensor based on the resolution and responsiveness of the encoder, the acceleration sensor, and the gyro sensor represented by the sensor information I. Specifically, the instruction part 21b sets proportional gain in the PID control to be larger as the resolution and the responsiveness are better. As described above, the instruction part 21b may properly set the control condition of the location control using the sensor information I received from the robot 10.

Next, the force control is explained. The instruction part 21b force-controls the drive part 14a of the manipulator 14 so that the measurement values of the force sensor and the torque sensor provided in the manipulator 14 may be target values. The force control is feedback control based on the measurement values of the force sensor and the torque sensor. In the force control, in setting of the target values of the measurement values of the force sensor and the torque sensor, the instruction part 21b sets a force and torque within the allowable ranges of the force sensor and the torque sensor represented by the sensor information I. Thereby, generation of load and torque that break the force sensor and the torque sensor by the force control may be prevented. The instruction part 21b sets the gain in the feedback control in response to the measurement values of the force sensor and the torque sensor based on resolution and responsiveness of the force sensor and the torque sensor represented by the sensor information I. As described above, the instruction part 21b may properly set the control condition of the force control using the sensor information I received from the robot 10.

In the robot 10, other set values necessary for the control of the robot 10 than the sensor information I and the power information P may be recorded, e.g. gain of a gyro servo may be recorded or an inertial coefficient, an attenuation coefficient, and a spring coefficient in the force control may be recorded, or information necessary for calibration of a camera coordinate system and a robot coordinate system used for spatial recognition by the robot 10 may be recorded. If the above described set values are recorded in the robot 10 in advance, when the controller 20 and the robot 10 are replaced, resetting of the above described set values may be omitted and a required period for resetting of the above described set values may be shortened. Particularly, regarding the gain of the gyro sensor, the inertial coefficient, the attenuation coefficient, and the spring coefficient, different values are generally set with respect to each operation of the robot 10, and therefore, the gain of the gyro servo, the inertial coefficient, the attenuation coefficient, and the spring coefficient may be recorded with respect to each operation of the robot 10.

Further, the instruction part 21b respectively derives driving amounts of the drive part 14a by the location control and the force control, combines the driving amounts (weighted-average or the like), and generates the control signal D for controlling the drive part 14a. Furthermore, the instruction part 21b drive-controls the gripper so that the measurement value of the tactile sensor (the gripping force of work or the like) may be a target value. In this regard, the instruction part 21b sets the gripping force within the allowable range of the tactile sensor represented by the sensor information I.

Here, the explanation of the control of the robot 10 at step S150 is ended and the explanation returns to the activation processing in FIG. 2A. If determining that the individual numbers of the sensors are not the same between the robot 10 and the controller 20 (step S110: N), the controller 20 determines whether or not replacement of the robot 10 has been authorized (step S120). That is, the controller 20 determines whether or not the replacement of the robot 10 is intended by the user. Specifically, the controller 20 allows the display part of the user I/F device 30 to display an image for checking whether or not to authorize the replacement of the robot 10, and receives an input operation for selection of whether or not to authorize the replacement of the robot 10 by the input part of the user IF device 30. If determining that the replacement of the robot 10 has not been authorized (step S120: N), the controller 20 ends the activation processing. That is, the controller determines that the robot 10 to be controlled has been replaced against the user's will and does not perform control of the robot 10.

If determining that the replacement of the robot 10 has been authorized (step S120: Y), the controller 20 updates and records the sensor information including the individual numbers (step S130). That is, the controller 20 updates and records the sensor information I of the memory 22 of itself using the sensor information I acquired from the robot 10 at step S100. Thereby, information representing performance of the group of sensors S etc. provided in the robot 10 controllably connected to the controller 20 at the present time when the power is ON can be held in the controller 20. At the same time, the information representing performance of the group of sensors S etc. provided in the robot 10 controllably connected to the controller 20 when the power was last turned off may be deleted from the controller 20. After updating and recording the sensor information I, the controller 20 can perform control of the robot 10 based on the updated and recorded sensor information I (step S150). Note that, in the case where the models of the robots 10 before and after the replacement are the same or the like, control of the robot 10 after replacement may be performed based on the sensor information I of the robot 10 before replacement according to the selection by the user.

2-2 Battery Management Processing:

FIG. 2B is a flowchart of battery management processing executed by the controller 20. For example, the battery management processing is processing executed in parallel to the activation processing in FIG. 2A and executed when at least one of the power of the robot 10 and the power of the controller 20 is turned ON. First, the controller 20 receives the power information P from the robot 10 (step S200). That is, in the robot 10, the transmission part 11a transmits the power information P recorded in the memory 12 to the controller 20. In the embodiment, step S100 in FIG. 2A and step S200 in FIG. 2B are collectively executed, and the transmission part 11a also transmits the power information P with the sensor information I to the controller 20. The power information P represents the accumulated period of periods in which the power of the robot 10 is OFF in the past and the last OFF time when the power of the robot 10 is last turned OFF.

Then, the analysis part 21a calculates the last OFF period from the last OFF time and the present time (step S210). That is, the analysis part 21a subtracts the last OFF time from the present time, and thereby, calculates the last OFF period. The last OFF time is information recorded in the robot 10, and, even when the robot 10 is replaced, the controller 20 may properly obtain the last OFF period of the robot 10 after replacement.

Then, the analysis part 21a accumulates the last OFF period on the accumulated period (step S220). That is, the analysis part 21a adds the last OFF period to the accumulated period, and thereby, calculates the latest accumulated period. The accumulated period is also the information recorded in the robot 10, and thus, even when the robot 10 is replaced, the controller 20 may properly obtain the accumulated period of the robot 10 after replacement.

Then, the analysis part 21a determines whether or not the accumulated period is equal to or less than an allowable value (step S230). Here, the allowable value may be a period in which e.g. the remaining amount of power of the battery is a predetermined value (e.g. 10% of the initial remaining amount of power or the like). The allowable value may be recorded in the robot 10 like the sensor information I or recorded in the controller 20 with respect to each model of the robot 10 identified from the sensor information I.

If determining that the accumulated period is not equal to or less than an allowable value (step S230: N), the analysis part 21a calculates a remaining period (step S240). The remaining period is a period obtained by subtraction of the present accumulated period from the lifetime of the battery. The lifetime of the battery may be derived by division of the amount of charged power of a new battery by the amount of power consumption per unit time in the OFF period. Then, the instruction part 21b allows the user I/F device 30 to output the remaining period (step S250). Thereby, the user may obtain a rough indication of the time for replacement of the battery.

On the other hand, if determining that the accumulated period is equal to or less than the allowable value (step S230: Y), the instruction part 21b allows the user I/F device 30 to output a battery replacement notice (step S260). Thereby, the user may be prompted to replace the battery. As described above, the power information P is information recorded in the robot 10, and, even when the robot 10 is replaced, the controller 20 may issue an appropriate notice with respect to the battery of the robot 10 after replacement.

2-3 Abnormality Determination Processing

FIG. 2C is a flowchart of abnormality determination processing executed by the controller 20. The abnormality determination processing is processing executed in parallel to the activation processing in FIG. 2A or processing executed at predetermined time intervals, and executed when at least one of the power of the robot 10 and the power of the controller 20 is turned ON. First, the controller 20 receives the sensor information I from the robot 10 and the present measurement value of the sensor (step S300). That is, the controller 20 acquires the chronological measurement values of each sensor in the past represented by the past data of the sensor information I and the present measurement value of each sensor (immediately after the power is turned ON).

Then, the analysis part 21a sets an allowable range represented by the sensor information I as a first allowable range (step S310). That is, the allowable range of the measurement value of each sensor shown in FIG. 1B is set as the first allowable range. As described above, the allowable range represented by the sensor information I includes the range in which each sensor can normally measure the measurement value, the range in which the accuracy of the measurement value of each sensor is equal to or more than the predetermined reference, and the range in which each sensor is not broken.

Then, the analysis part 21a determines whether or not the present measurement value of each sensor is within the first allowable range (step S320). That is, the analysis part 21a determines whether or not each sensor may normally measure the measurement value, whether or not each sensor may measure the measurement value with the accuracy equal to or more than the predetermined reference, and whether or not each sensor is broken.

If the present measurement value of each sensor is not within the first allowable range (step S320: N), the instruction part 21b allows the user I/F device 30 to output an abnormality notice (step S330). That is, the instruction part 21b alerts the user that the sensor of the robot 10 measures an abnormal measurement value. Specifically, the controller 20 allows the display part of the user I/F device 30 to display the abnormality notice as an analysis result of the sensor information I. Note that the instruction part 21b may stop the robot 10 with the output of the abnormality notice. Here, the case where the determination that the present measurement value of each sensor is not within the first allowable range is made means that the present measurement value of at least one sensor is outside the first allowable range.

If determining that the present measurement value of each sensor is within the first allowable range (step S320: Y), the analysis part 21a sets a second allowable range based on the chronological measurement values in the past (step S340). The past data of the sensor information I of the embodiment represents the measurement values of each sensor in the chronological order (at predetermined time intervals in the normal operation) in the past. The analysis part 21a derives the second allowable range by statistical processing of the chronological measurement values of each sensor in the normal operation. For example, the analysis part 21a may calculate an average value G and standard deviation H of the chronological measurement values of each sensor in the normal operation, and set a range of G±n×H as the second allowable range. Here, n is a natural number (e.g. 2 or 3). Note that the analysis part 21a may set a range from the minimum value to the maximum value of the chronological measurement values of each sensor in the normal operation as the second allowable range.

Then, the analysis part 21a determines whether or not the present measurement value of each sensor is within the second allowable range (step S350). That is, the analysis part 21a determines whether or not the measurement value of the sensor in the present belongs to the second allowable range derived from the measurement values of the sensor in the past, and thereby, determines whether or not the robot 10 is abnormal. The range of G±n×H is set as the second allowable range, and thereby, the analysis part 21a may determine whether or not the present measurement value is stochastically singular in the distribution of the chronological measurement values of each sensor in the normal operation.

If the present measurement value of each sensor is not within the second allowable range (step S350: N), the instruction part 21b allows the user I/F device 30 to output an abnormality notice (step S330). That is, the instruction part 21b alerts the user that the sensor of the robot 10 measures an abnormal measurement value. Here, the case where the determination that the present measurement value of each sensor is not within the second allowable range is made means that the present measurement value of at least one sensor is outside the second allowable range.

On the other hand, if the present measurement value of each sensor is within the second allowable range (step S350: Y), the instruction part 21b allows the user I/F device 30 to output a normality notice (step S360). Here, the case where the determination that the present measurement value of each sensor is within the second allowable range is made means that the present measurement values of all sensors are within the second allowable range.

3. Other Embodiments

The measurement values of the sensor in the past represented by the sensor information I are not necessarily the chronological measurement values of each sensor in the normal operation. For example, the sensor information I may represent the measurement values of the sensor at the time when an abnormality occurred in the past. In this case, if the difference (absolute value) of the present measurement value of each sensor from the measurement value of the sensor at the time when an abnormality occurred in the past is equal to or less than a predetermined value, the analysis part 21a of the controller 20 may output an abnormality notice that an abnormality may occur in the robot 10. It is only necessary to record the measurement value at the abnormality time, and thereby, the data volume of the sensor information I may be suppressed.

Further, the sensor information I may represent the measurement values of the sensor with respect to each location of the movable part in the past. For example, in the location control, the target location and position of the control reference point of the manipulator 14 (e.g. the predetermined location of the end effector) are set, however, the robot 10 may record the measurement value of the sensor in the past in correspondence with the target location and position. For example, the robot 10 may record the measurement values of the sensor in the past with respect to the case where the location of the control reference point of the manipulator 14 is at the center of the movable range and the case where the location is on the edge of the movable range. Thereby, the controller 20 may determine whether or not the present measurement value is normal as the measurement value when the control reference point of the manipulator 14 is at the center of the movable range. Similarly, the controller 20 may determine whether or not the present measurement value is normal as the measurement value when the control reference point of the manipulator 14 is on the edge of the movable range. Obviously, the robot 10 may divide the movable range into three or more spaces and record measurement values of sensors in the past with respect to each space.

FIGS. 3A to 3C are schematic diagrams showing arrangements of the analysis part 21a and the instruction part 21b in the robot system. FIG. 3A shows the arrangement of the analysis part 21a and the instruction part 21b in the first embodiment. Namely, both the analysis part 21a and the instruction part 21b are provided in the controller 20. In the configuration, the sensor information I is transmitted from the robot 10 to the controller 20, and the control signal D generated based on the sensor information I is transmitted to the robot 10.

FIG. 3B shows an example in which an analysis part 41a is provided in an analysis PC (personal computer) 40 as an external apparatus, and the instruction part 21b is provided in the controller 20. As shown in the drawing, the transmission part 11a of the robot 10 transmits the sensor information I to the analysis PC 40, and the analysis part 41a of the analysis PC 40 analyzes the sensor information I. Then, the analysis PC 40 transmits analysis information R representing an analysis result in the analysis part 41a to the controller 20. For example, the analysis information R may be information representing the second allowable range in the first embodiment. Thereby, in the controller 20 receiving the analysis information R, the instruction part 21b may control the robot 10 based on the analysis result of the sensor information I. As described above, the transmission part 11a of the robot 10 may transmit the sensor information I to the controller 20 or the external apparatus (analysis PC 40), but does not necessarily transmit the sensor information I to the controller 20.

FIG. 3C shows an example in which an analysis part 51a is provided in a server 50 as an external apparatus and the server 50 is communicable with a plurality of the robots 10. As shown in the drawing, the respective robots 10 controlled by the controllers 20 transmit sensor information I to the server 50 and the analysis part 51a collects the sensor information I. Then, the analysis part 51a analyzes the sensor information I by statistical processing of the sensor information I. Further, the server 50 transmits analysis information R representing an analysis result in the analysis part 51a to the controller 20. For example, the analysis part 51a may derive the second allowable range by statistic processing of the measurement values in the past represented by the sensor information I collected from the plurality of robots 10. Many pieces of sensor information I may be statistically processed, and thereby, the second allowable range with high statistical reliability may be derived. Further, even when the sensor information I is collected from the different models of robots 10, the measurement values of the sensors provided in common may be statistically processed and the second allowable range with high statistical reliability may be derived.

Furthermore, the sensor information I may be provided in the recording part within the robot 10, and the recording part is not necessarily provided in the control unit C of the robot 10. For example, a memory may be provided with respect to each sensor provided in the robot 10, and the memory may record the sensor information I on the sensor. Then, at the stage for transmitting the sensor information I to the controller 20 or the like, the transmission part 11a may collect the sensor information I from the memory provided in each sensor. For example, in a configuration in which the end effector is detachable from the manipulator, the sensor information I on the sensor provided in the end effector may be recorded in the memory of the end effector. For example, if only the individual number indicated by the sensor of the end effector is changed, the controller 20 may recognize that, not the whole robot 10, but only the end effector has been replaced. Or, the controller 20 is not necessarily physically separated from the robot 10, and the controller 20 may be built in the robot 10 in a dual-arm robot or the like. Further, the robot 10 may record the sensor information I on the group of sensors S provided in the controller 20. In addition, the group of sensors S or the single sensor may be provided in another than the robot 10, e.g. in an accessory device of the robot 10 that may be replaced together with the robot 10 with respect to the controller 20. For example, the group of sensors S may be provided in an accessory device such as an imaging unit, a communication unit, or the end effector attached to the robot 10, and the robot 10 may record sensor information I on the group of sensors S. In this case, the accessory device and the robot 10 make communication and the robot 10 may record the sensor information I acquired by the communication.

The entire disclosure of Japanese Patent Application No. 2015-012141, filed Jan. 26, 2015 is expressly incorporated by reference herein.

What is claimed is:

1. A robot controlled by a controller comprising:
   a control unit comprising
      a recording part that records sensor information obtained by a plurality of sensors during power-up of at least one of the controller or the robot; and
      a transmission part that transmits the sensor information to the controller,
   wherein the control unit receives a control signal from the controller for controlling the robot when the controller determines that the sensor information recorded during the power-up of the at least one of the controller or the robot coincides with sensor information stored by the controller,
   wherein the recording part records power information corresponding to an OFF time representing when the robot was powered OFF, and
   the transmission part transmits the power information with the sensor information to the controller.

2. The robot according to claim 1, further comprising the plurality of sensors.

3. The robot according to claim 1, wherein the sensor information is data indicating a sensor type corresponding to each sensor of the plurality of sensors.

4. The robot according to claim 1, wherein the sensor information represents performance of the plurality of sensors.

5. The robot according to claim 1, wherein the sensor information represents previously recorded sensor information corresponding to the plurality of sensors.

6. The robot according to claim 5, wherein the previously recorded sensor information represents chronological measurement values.

7. The robot according to claim 5, wherein the previously recorded sensor information represents a measurement value of the plurality of sensors at a time when an abnormality occurred.

8. The robot according to claim 5, wherein the plurality of sensors are provided in a movable part, and
   the sensor information represents a measurement value of the plurality of sensors with respect to each location of the movable part in the past.

9. A robot system comprising:
   a robot including a sensor and a recording part that records sensor information about the sensor during power-up of the robot; and
   a controller that controls at least the robot,
   wherein the controller includes an analysis part that receives the sensor information from the robot and analyzes the sensor information to determine whether the sensor information coincides with previously recorded sensor information stored at the controller,
   wherein the controller provides a control signal for controlling the robot when the sensor information recorded during power-up coincides with the previously recorded sensor information,
   wherein the sensor information comprises previously chronologically recorded measurement values wherein the controller generates a first allowable range for the sensor based on the sensor information, wherein the controller generates an abnormality notice when the sensor information recorded during power-up is not within with the first allowable range,
   wherein the controller generates a second allowable range by calculating an average value G and standard deviation H of the chronologically recorded measurement values of the sensor when the sensor information recorded during power-up is within the first allowable range, wherein the second allowable range is defined by $G \pm n \times H$, where n is a natural number, wherein the controller generates the abnormality notice when the sensor information recorded during power-up is not within with the second allowable range.

10. The robot system according to claim 9, wherein the analysis part determines whether a measurement value of the sensor in the present belongs to an allowable range derived from a measurement value of the sensor in the past, and determines that the robot is abnormal when the measurement value of the sensor in the present is not in the allowable range.

11. The robot system according to claim 10, wherein the controller including the analysis part allows a display part to display an analysis result of the sensor information.

12. A robot system comprising:
   a robot including a plurality of sensors, a recording part that records sensor information obtained by the plurality of sensors during power-up of the robot, and a transmission part; and a controller that controls at least the robot, wherein the controller receives the sensor information from the robot and determines whether or not an individual sensor of the controllably connected robot is changed based on whether or not sensor information corresponding to the individual sensor based upon a comparison of the sensor information corresponding to the individual sensor with previously recorded sensor information corresponding to the individual sensor stored by the controller, wherein the controller transmits a control signal to the robot when the sensor information recorded during power-up coincides with previously recorded sensor information stored by the controller and generates an abnormality notice when the sensor information recorded during power-up does not coincide with the previously recorded sensor information stored by the controller, wherein the recording part records power information corresponding to an OFF time representing when the robot was powered OFF, and the transmission part transmits the over information with the sensor information to the controller.

\* \* \* \* \*